July 10, 1928.

J. F. FLANNERY

VEHICLE HEADLIGHT

Filed Dec. 29, 1926

Inventor

J. F. Flannery

By Lacey & Lacey, Attorneys

July 10, 1928.
J. F. FLANNERY
VEHICLE HEADLIGHT
Filed Dec. 29, 1926
1,676,690
2 Sheets-Sheet 2
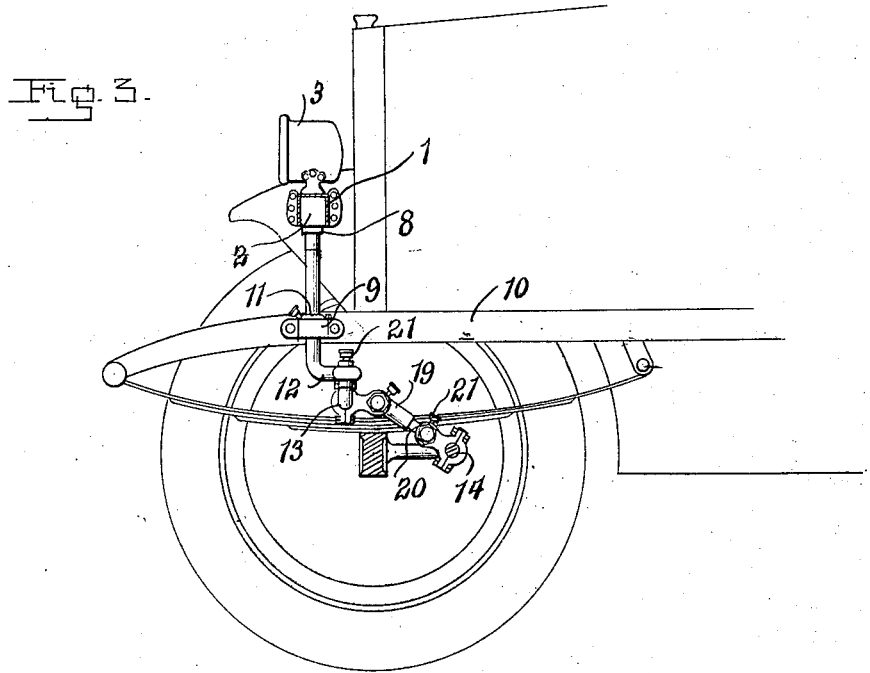
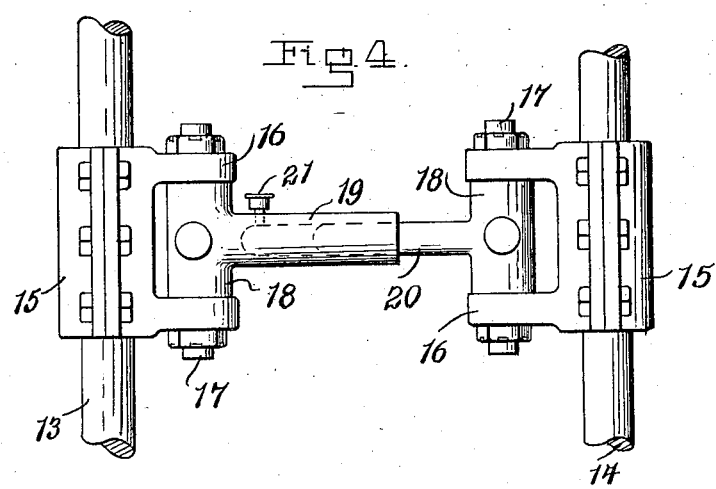
Inventor
J F Flannery
By Lacey & Lacey, Attorneys Patented July 10, 1928.

1,676,690

UNITED STATES PATENT OFFICE.

JOHN F. FLANNERY, OF CARBONDALE, PENNSYLVANIA.

VEHICLE HEADLIGHT.

Application filed December 29, 1926. Serial No. 157,754.

The invention relates to headlights designed chiefly for automobiles and the various types of motor vehicles, whereby the driver is enabled to observe the roadway after dark whether traveling straight ahead or negotiating a turn or when deviating from a straight course, either to the right or to the left.

The invention contemplates pivotally mounting the headlights, and connecting them with the steering gear, so that the steering wheels and headlights turn in consonance with the result that, the rays of light are thrown upon the roadway directly in advance of the vehicle, whether traveling upon a curve or making a turn, and in consequence objects may be avoided and running off the road prevented, thereby materially reducing the chances for accidents when driving at night.

While the drawings illustrate a preferred embodiment of the invention, it is to be understood that in adapting the means to meet specific needs and requirements the design may be varied and other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 3 is a side view parts being in section, and

Figure 4 is an enlarged plan view of portions of the links connecting the arms of the steering knuckles and the arms of the lamp posts, showing the compensating connection therebetween.

Corresponding and like parts are referred to in the following description and designated in the several views of the drawings by like reference characters.

Figures 1, 2:
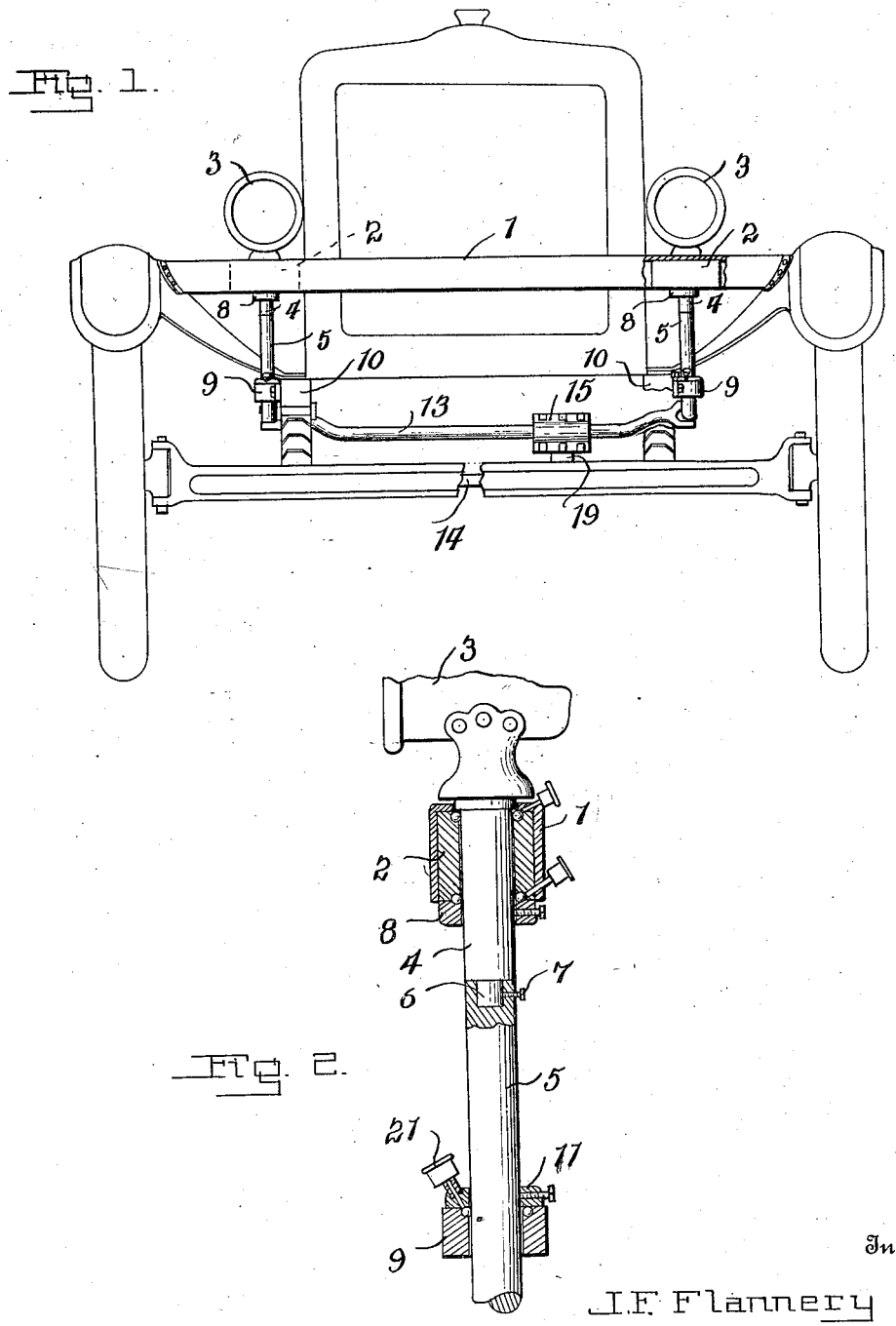
Figure 1 is a front view of a motor vehicle provided with headlights embodying the invention.
Figure 2 is a detail view of a portion of the post supporting a headlight and parts intimately associated therewith, the elements being shown on a larger scale.

In accordance with the invention, the bar 1 is disposed in front of the radiator of the vehicle and is connected at its ends to the forward portions of the front wheel fenders. The bar 1 is of channel formation and disposed with the open side facing downwardly. Metal blocks 2 are fitted within end portions of the bar 1 and receive the posts of the lamps 3. For convenience of construction and assemblage, the lamp posts are of sectional formation, each consisting of an upper section 4 and a lower section 5. The upper end of the section 4 is enlarged to limit its downward movement in the bar 1 and block 2. The lower end of the section 4 is reduced as indicated at 6, and snugly fits within a socket at the upper end of the section 5, a clamp screw 7 securing the sections when properly assembled. Anti-friction bearings are provided between the section 4 and the block 2 to reduce the friction to the smallest amount possible. A collar 8 secured to the section 4 below the block 2 prevents upward movement of said sections after the parts have been assembled and made secure. A bracket 9 bolted, or otherwise secured to the outer side of each of the longitudinal bars 10 receives the lower section 5 of the lamp post and an anti-friction bearing is provided between the bracket and the section 5 of the posts to minimize the resistance and wear incident to the turning of the posts. A stop collar 11 is secured to the section 5 and rests upon the upper side of the bracket 9 thereby assisting materially in supporting the posts and preventing downward displacement thereof. An arm 12 projects rearwardly from the lower end of each of the lamp posts and these arms are connected by means of a link 13, the end portions of which are deflected upwardly to the plane of the arms 12. Endwise movement of the link 13 effects a synchronous pivotal movement of the posts and a corresponding turning of the headlights.

A transverse link 14 connects the arms of the steering knuckles in a manner well understood. The links 13 and 14 are coupled by means of a compensating connection to cause both to move in unison and to allow for the variation of the distances between the two links in the various adjusted positions thereof incident to steering. As shown most clearly in Figure 4 of the drawings the compensating connection includes similar clamps 15 which are mounted upon the links and made fast thereto. Each of the clamps 15 comprises sections which are fitted about a link and bolted thereto. Apertured ears 16 project from each of the clamps and receive a pin 17 which extends through a sleeve 18 placed between the respective ears. A tube 19 projects from one of the sleeves 18 and receives a stem 20 projecting from the other sleeve. The parts 19 and 20 telescope and cause the link 13 to move with the link 14 when the latter is operated to steer the vehicle. The telescopic connection of the parts 19 and 20 compensates for variation in the distances between the two links 13 and 14 incident to their movement when steering the vehicle. It is observed that ball bearings will be provided at determinate points to reduce the friction to the smallest amount possible, and oil cups 21 will likewise be located wherever necessary to lubricate moving parts to minimize the wear and friction.

Having thus described the invention, I claim:

1. In dirigible headlights for vehicles, the combination with pivotally mounted lamps, and a link connecting the lamps for synchronous movement, of a compensating connection between said link and the steering link connecting arms of the steering knuckles, the same comprising clamps fast to the respective links, a pair of ears projecting rearwardly from the clamp on the first-mentioned link, a pair of ears projecting forwardly from the clamp on the steering link, sleeves mounted between each pair of ears, pivots inserted through the respective ears and links, a tube projecting from one of the sleeves and a stem projecting from the other sleeve and having a telescopic engagement with the said sleeve.

2. In vehicle headlights, the combination of a channel bar connecting the front wheel fenders forwardly of the radiator, blocks within end portions of the fender connecting bar, brackets carried by longitudinal frame bars, lamp posts journaled in the said blocks and brackets and having lateral arms at their lower ends below the brackets, a link extending between and pivotally connected to the arms of the lamp posts, and a compensating connection between the said link and the steering link connecting arms of the steering knuckles, said connection comprising similar clamps provided with ears, sleeves pivoted between the respective ears, and a telescopically engaged tube and stem projecting from the respective sleeves.

In testimony whereof I affix my signature.

JOHN F. FLANNERY.